US007945902B1

(12) United States Patent
Sahoo

(10) Patent No.: US 7,945,902 B1
(45) Date of Patent: May 17, 2011

(54) DETECTION OF NON-STANDARD APPLICATION PROGRAMMING INTERFACE USAGE VIA ANALYSIS OF EXECUTABLE CODE

(75) Inventor: Sanjeeb K. Sahoo, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 1216 days.

(21) Appl. No.: 11/180,819

(22) Filed: Jul. 13, 2005

(51) Int. Cl.
*G06F 9/44* (2006.01)
(52) U.S. Cl. ........ 717/131; 717/126; 717/127; 717/129; 714/38; 714/48
(58) Field of Classification Search .......... 717/120–135, 717/168–178; 707/103 R; 715/762, 810, 715/765; 714/38
See application file for complete search history.

(56) References Cited

U.S. PATENT DOCUMENTS

| 5,187,786 | A  | * | 2/1993 | Densmore et al. | 707/3 |
| 5,583,983 | A  | * | 12/1996 | Schmitter | 717/138 |
| 5,999,728 | A  | * | 12/1999 | Cable | 717/105 |
| 6,081,665 | A  | * | 6/2000 | Nilsen et al. | 717/116 |
| 6,684,387 | B1 | * | 1/2004 | Acker et al. | 717/126 |
| 6,910,208 | B1 |   | 6/2005 | Zimniewicz | |
| 2003/0110313 | A1 | * | 6/2003 | Dochez et al. | 709/328 |
| 2003/0208685 | A1 | * | 11/2003 | Abdel-Rahman | 713/191 |
| 2004/0177352 | A1 | * | 9/2004 | Narayanaswamy et al. | 717/169 |
| 2005/0193269 | A1 | * | 9/2005 | Haswell et al. | 714/38 |

OTHER PUBLICATIONS

Portable applications in current computing [Java], Janecek, J., IEEE, Sep. 7-9, 1997, pp. 104-105.*
A new development framework based on efficient middleware for real-time embedded heterogeneous multicomputers, Janka, R., IEEE, Mar. 7-12, 1999, pp. 261-268.*
Software portability in open architectures, Mosbeck, R.A.; Reeve, L.C.; Thedens, J.R., IEEE, vol. 2 Oct 2001, pp. 9E1/1-9E1/8.*
Java™ 2 Platform Enterprise Edition Specification, v1.4, Shannon, Sun microsystems Inc., Nov. 24, 2003, pp. 13-231.*
Java TM AVK for the Enterprise: Testing J2EE TM Applications for Portability, Technical White Paper; SUN Microsystems, Apr. 2004, pp. 1-16.*
"Java™ AVK for the Enterprise: Testing J2EE™ Applications for Portability", Technical White Paper; Apr. 2004, 16 pages; Santa Clara, California, U.S.A.
Radim Kubacki, "Classclosure", printed from the internet: http://www.netbeans.org/servlets/ReadMsg?msgId=229592&listName=contrib, Jan. 11, 2002, 1 page.
"Migrating and Redeploying Server Applications Guide"; Sun ONE Application Server; Version 7, Update 1; Mar. 2003; Chapter 3; pp. 115-142.
Bill Shannon; "Java™ 2 Platform Enterprise Edition Specification, v1.4"; Sun Microsystems, Inc.; Nov. 24, 2003; pp. 5-22; Santa Clara, California, U.S.A.
"Java™ Application Verification Kit (AVK) for the Enterprise", printed from the internet: http://web.archive.org/web/20050319020757/http://java.sun.com/j2ee/avk/, Sun Microsystems, Inc., 2 pages.

* cited by examiner

*Primary Examiner* — Anna Deng
*Assistant Examiner* — Satish Rampuria
(74) *Attorney, Agent, or Firm* — Robert C. Kowert; Meyertons, Hood, Kivlin, Kowert & Goetzel, P.C.

(57) ABSTRACT

A method for detection of non-portable application programming interface usage via executable code analysis includes identifying one or more conditions for inclusion of an object class within a set of acceptable object classes, wherein a reference to any object class of the set of acceptable object classes by an application is in compliance with a specified portability criterion. The method further includes analyzing an executable version of the application to identify object classes referenced by the application, and generating a portability verification report for the application, wherein the report indicates that the application violates the specified portability criterion if an object class referenced by the application does not meet at least one of the conditions for inclusion in the set of acceptable classes.

21 Claims, 7 Drawing Sheets

| | | |
|---|---|---|
| | | ConstantMethodRef ... |
| | | ConstantFieldRef... |
| | | ConstantClass ... |
| | | ConstantClass ... |
| | | ConstantString ... |
| | | ... |

Table 555 (Contains String Constants, Class And Interface Names, Field Names Referred To In Class)

Class File Structure 500

| | | |
|---|---|---|
| 4 | Magic_Number 501 | |
| 2 | Minor_Version 503 | |
| 2 | Major_Version 505 | |
| 2 | Constant_Pool_Count 507 | |
| (varies) | Constant_Pool 509 | |
| 2 | Access_Flags 511 | |
| 2 | This_Class 513 | |
| 2 | Super_Class 515 | |
| 2 | Interfaces_Count 517 | |
| (varies) | Interfaces 519 | |
| 2 | Fields_Count 521 | |
| (varies) | Fields 523 | |
| 2 | Methods_Count 525 | |
| (varies) | Methods 527 | |
| 2 | Attributes_Count 529 | |
| (varies) | Attribute_Info 531 | |

Field Length (Bytes) 590    Field Name 595

FIG. 5

DETECTION OF NON-STANDARD APPLICATION PROGRAMMING INTERFACE USAGE VIA ANALYSIS OF EXECUTABLE CODE

BACKGROUND OF THE INVENTION

1. Field of the Invention

The present invention is directed to computer systems. More particularly, it is directed to verification of portability of computer system applications.

2. Description of the Related Art

The complexity and expense of developing and deploying enterprise-level computer systems applications has been increasing over time. In addition to supporting a rich set of functional features, a modern enterprise application may also have to be scalable enough to support large numbers of concurrent users, and provide a high level of availability, maintainability and interoperability with other applications. The development cycle for a single major release of an application may take months or even years, and may require hundreds of person-years of development resources. As a result, enterprise application vendors are understandably eager to reduce the total cost of application development.

In the past, application vendors often developed a first version of an enterprise application for a particular execution platform (e.g., a combination of a computer hardware architecture and an operating system designed for the hardware architecture), and then ported the application to other execution platforms as needed. Each ported version of the application typically went through a quality assurance test cycle on the corresponding platform. Quality assurance testing, during which the functionality, performance and other features of the enterprise application are tested, often represents a substantial portion of the total expense of application development. In order to reduce porting and testing costs, and also in response to growing customer demand for applications that can be deployed across a variety of hardware architectures and operating systems, in recent years many application vendors have begun to target their applications to application server environments (such as the Java 2 Enterprise Edition (J2EE™) environment) that are intended to be platform-agnostic. Typically, a standards organization (or a collaborative body such as the participants in the "Java Community Process" in the case of J2EE™) is responsible for defining standards for the application server technology in the form of formal specification documents. The specification documents define the functionality and interfaces that must minimally be supported for compliance with a particular version of the application server technology. As application server is typically designed and advertised as being compliant with a particular version of an application server technology, and potential users and developers may consult the specifications associated with that version to determine the set of features supported by the application server. Applications developed in accordance with a particular version of a specification are expected, in principle, to be deployable without source code modification at any application server that conforms to that version of the specification (e.g., simply by modifying runtime deployment descriptors), regardless of the specific operating system or hardware architecture of the platform on which the application server is executed. Thus, once an application vendor has developed and tested such a portable application on an application server on one platform, no further source code changes should be required to deploy the application on other platforms, and the application vendor should also be able to reduce or eliminate additional testing required for the other platforms.

Unfortunately, application servers provided by different application server vendors may differ slightly in the set of functions and features provided, even where the different application server vendors claim compatibility with the same set of specifications. For example, the specifications may allow optional features or extensions to be implemented, and different application server vendors may implement different sets of optional functions. As a result, an application developed on a particular application server may sometimes use features such as application programming interfaces (APIs) that are vendor-specific. Also, some development environments may support the use of so-called "wrapper" APIs that may allow developers to utilize standard APIs through non-standard intermediary interfaces that may be easier to use than the standard APIs. Both vendor-specific and wrapper APIs may make applications non-portable; that is, applications using such non-standard features may work as designed at one vendor's application server, but may fail at another vendor's application server, even when both vendors claim to support the same standard specifications. Some applications using non-standard extensions may even work at application servers from more than one vendor (e.g., if two or more vendors implement some of the same non-standard extensions) and hence may be considered at least somewhat portable; in general, however, applications that use non-standard extensions may not be guaranteed to work at all application servers that support the same standard specification and thus may raise portability concerns. Application customers that do not wish to be dependent upon specific vendors, and application developers tasked with developing portable applications, may therefore wish to determine whether a given application is truly portable.

Some traditional tools for identifying non-portable features of applications may require access to application source code, which may not be easily accessible to customers. Other conventional tools may attempt to build a repository of non-standard features or APIs for various application server components, and check whether any of the non-standard features are used in an application. However, it may be difficult to accurately track the set application server extensions being supported by all the different application server vendors. As a result, an approach that relies on maintaining an exhaustive list of non-standard features may not be accurate or complete in its identification of the non-portable features of an application. In addition, portability criteria may change over time (e.g., as standards or specifications change), and traditional portability verification tools may themselves require source code modifications to adapt to changes in portability criteria.

SUMMARY

Various embodiments of a method and system for detection of non-portable application programming interface usage via executable code analysis are disclosed. According to one embodiment, a method includes identifying one or more conditions for inclusion of an object class within a set of acceptable object classes, wherein a reference to any object class of the set of acceptable object classes by an application is in compliance with a specified portability criterion. The method further includes analyzing an executable version of the application to identify object classes referenced by the application, and generating a portability verification report for the application, wherein the report indicates that the application violates the specified portability criterion if an object class referenced by the application does not meet at least one of the conditions for inclusion in the set of acceptable classes. In one embodiment, the application may reference one or more external classes (e.g., classes that are not defined within the application itself or in optional libraries deployed with the application), and a condition of the one or more conditions may include a requirement that each of the external classes is defined in a standard application programming interface specification, such as a J2EE specification. Other conditions may include a requirement that the class be defined within the application or a shared library bundled within a deployed version of the application.

In one embodiment, the method may include identifying root object classes (e.g., classes that represent entry points that are called by an application server when an application request arrives, in order to pass the execution context to the application) referenced by a deployable version of the application, and recursively parsing executable code corresponding to the root object classes to identify a transitive closure of the set of non-root object classes referenced directly or indirectly by the root object classes. In parsing the executable code, the method may include loading a byte stream representing the executable code of the object class into memory, where the byte stream is formatted in accordance with an object class file format specification, identifying a section of the byte stream that includes names of one or more classes referenced from the current class, and obtaining the names of the referenced classes from that section. In some embodiments, the class file containing the byte stream may be located and loaded into memory by a class file loader based on a class name and a search path. The root object classes may be identified from deployment descriptors included in a deployable version of the application in one embodiment, e.g., from EJB module deployment descriptors and/or web module deployment descriptors of a J2EE application. In one embodiment, a method may include providing an interface to specify the portability criterion, and in response to input via the interface, identifying a new portability criterion without modifying source code.

BRIEF DESCRIPTION OF THE DRAWINGS

FIG. 5 is a block diagram illustrating an exemplary class file structure organized in accordance with a class file format standard, according to one embodiment.

Figure 1:
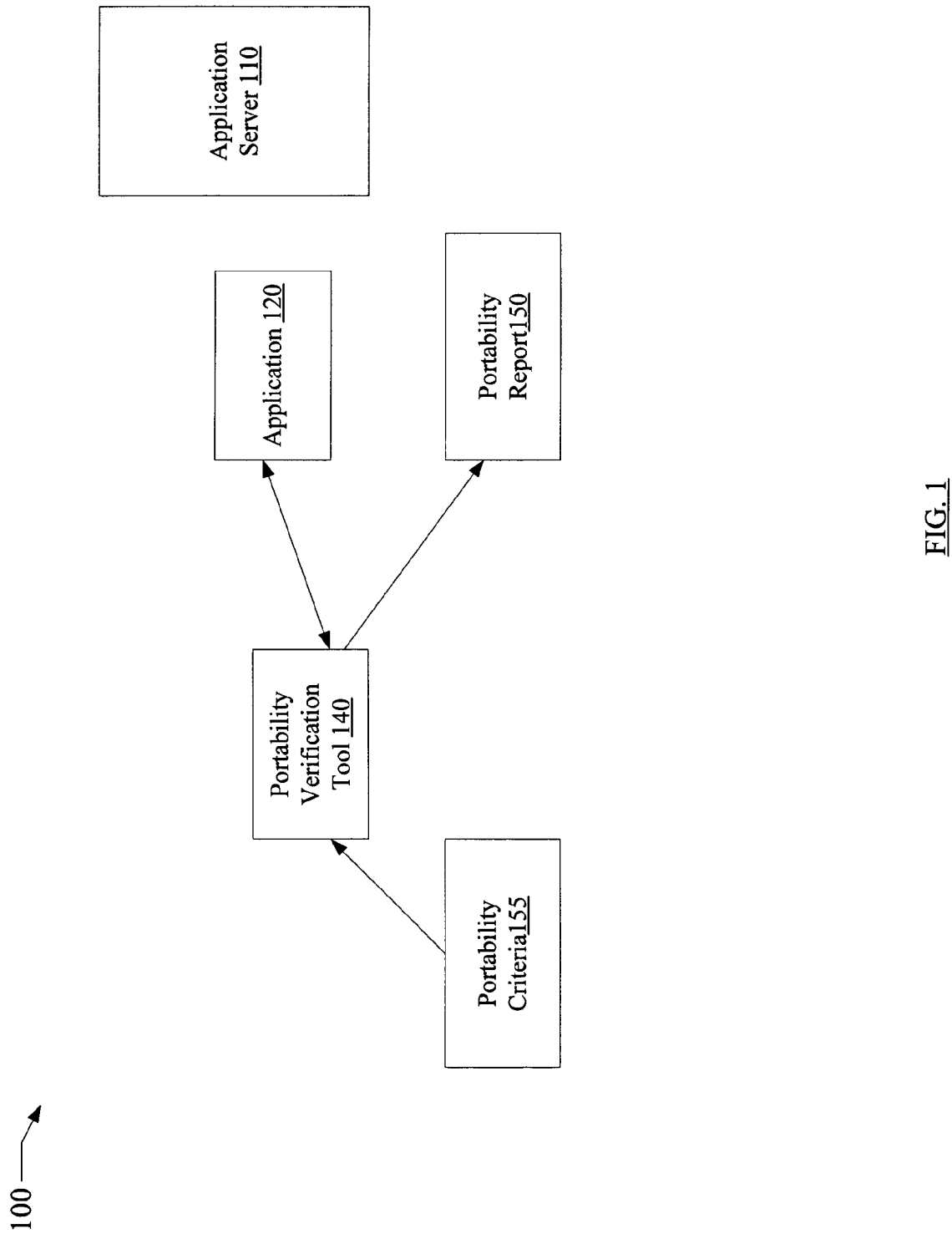
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram illustrating one embodiment of a system 100. The system includes an application 120 and a portability verification tool 140. Portability verification tool 140 may be configured to identify one or more conditions for inclusion of an object class in a set of acceptable object classes, wherein a reference to any object class of the set of acceptable object classes by application 120 is in compliance with one or more specified portability criteria 155. In addition, the portability verification tool 140 may also be configured to analyze an executable version of application 120 to identify object classes referenced by the application, and generate a portability report 150 for the application 120. Portability report 150 may indicate that the application 120 violates a specified portability criterion 155 if an object class referenced by the application 120 does not meet at least one condition of the one or more conditions. Portability criteria 155 may, for example, specify that the application be compliant with particular versions of one or more application programming interface (API) standard specifications. For example, in one embodiment the application may be considered non-portable if it utilizes interfaces to application server services (e.g., services that are not implemented, within the application itself, but are typically supported by an application server, such as transaction services, security services, messaging services etc.) that are not required by or defined in a particular API standard specification, such as vendor-specific extensions of standard interfaces. Non-standard features may be introduced into application 120 for various reasons—e.g., to provide enhanced functionality (such as nested transaction services, or specific types of messaging services) that is not required by a standard specification, to ease application development (e.g., using non-standard wrapper interfaces) or simply because an application developer was not aware of the portability implications of doing so. Non-standard application server service interfaces may be supported by various application server vendors, but an application 120 that relies on non-standard interfaces or on non-standard services may not run successfully at an application server that adheres more strictly to the standard specifications, or at an application server that supports a different set of non-standard services or interfaces, and thus may be considered non-portable in some embodiments. It is noted that some applications using non-standard extensions may function as designed at application servers from more than one vendor (e.g., if two or more vendors implement some of the same non-standard extensions) and hence may be considered at least somewhat portable. Thus, a violation of the portability criteria 155 by an application may not necessarily imply that the application will not function correctly at application servers from more than one vendor. In general, however, applications that use non-standard extensions may not be guaranteed to run successfully at all application servers that support the same standard specification.

In one implementation, the set of acceptable object classes may include object classes that are defined either within the application 120 itself, in object code packages or shared libraries bundled with the application, or in the versions of the API standard specification identified by the portability criteria. In the following description, the terms "object class" and "class" may be used synonymously. The executable version of the application 120 may be analyzed for portability violations without requiring access to the source code of the application and/or without actually executing the application, thus allowing application customers and other interested parties to easily verify application portability without going to the trouble of analyzing source code and without incurring the expense of testing the application in an execution environment such as an application server.

In some embodiments, application 120 may be intended for deployment at an application server 110. An application server 110 may be any type of execution environment designed to allow applications 120 to be developed and deployed, e.g., independently of the details of hardware architectures and operating systems, and may be implemented using any of a variety of technologies in various embodiments. Application server 110 may be configured to provide a variety of application server services, e.g., services that implement commonly-used functionality that may be useful to a variety of deployed applications, such as transaction services, security services, connection pooling services, messaging services, etc. Various applications 120 may utilize the specific sets of application server services that they require, and application developers may simply employ the services provided by the application server without re-implementing them for each individual application. In one embodiment, application 120 and application server 110 may be configured to utilize J2EE™ technology; in other embodiments, other technologies such as .NET may be employed. In one embodiment, application 120 may be a standalone application that may be executable without being deployed to an application server 110.

Any type of application 120 (or a portion of a multi-tiered application) may be checked for portability according to specified portability criteria 155 in various embodiments. Application 120 may reference both internal classes and functions (e.g., classes and methods defined and implemented within the application or in shared libraries bundled within a deployed version of the application), as well as external classes and functions that may not be implemented within the application (e.g., the classes and methods implementing common functions or services that may be provided by the application server 110 and utilized by a variety of applications as described above, such as transaction management functions, security-related functions, connection pooling functions, messaging functions etc.) Portability criteria 155 may be derived, for example, from one or more versions of an API specification associated with a particular application execution technology such as J2EE™: e.g., an application that references an external class that does not belong to a particular version of the specification may be considered non-portable with respect to that version of the specification. An application 120 may be a multi-tiered commercial application such a web-based electronic commerce system, for example, comprising a plurality of components, some of which may be executed within an application server 110, while others may be executed outside application server 110 (e.g., at one or more web servers and/or back-end database servers). Alternately, in other embodiments, the application may be a single-tiered application such as a simulation tool that may be deployed in its entirety to the application server 110. In various embodiments, application 120, application server 110 and portability verification tool 140 may each be implemented using any desired combination of programming languages and/or scripting languages.

Figure 2:
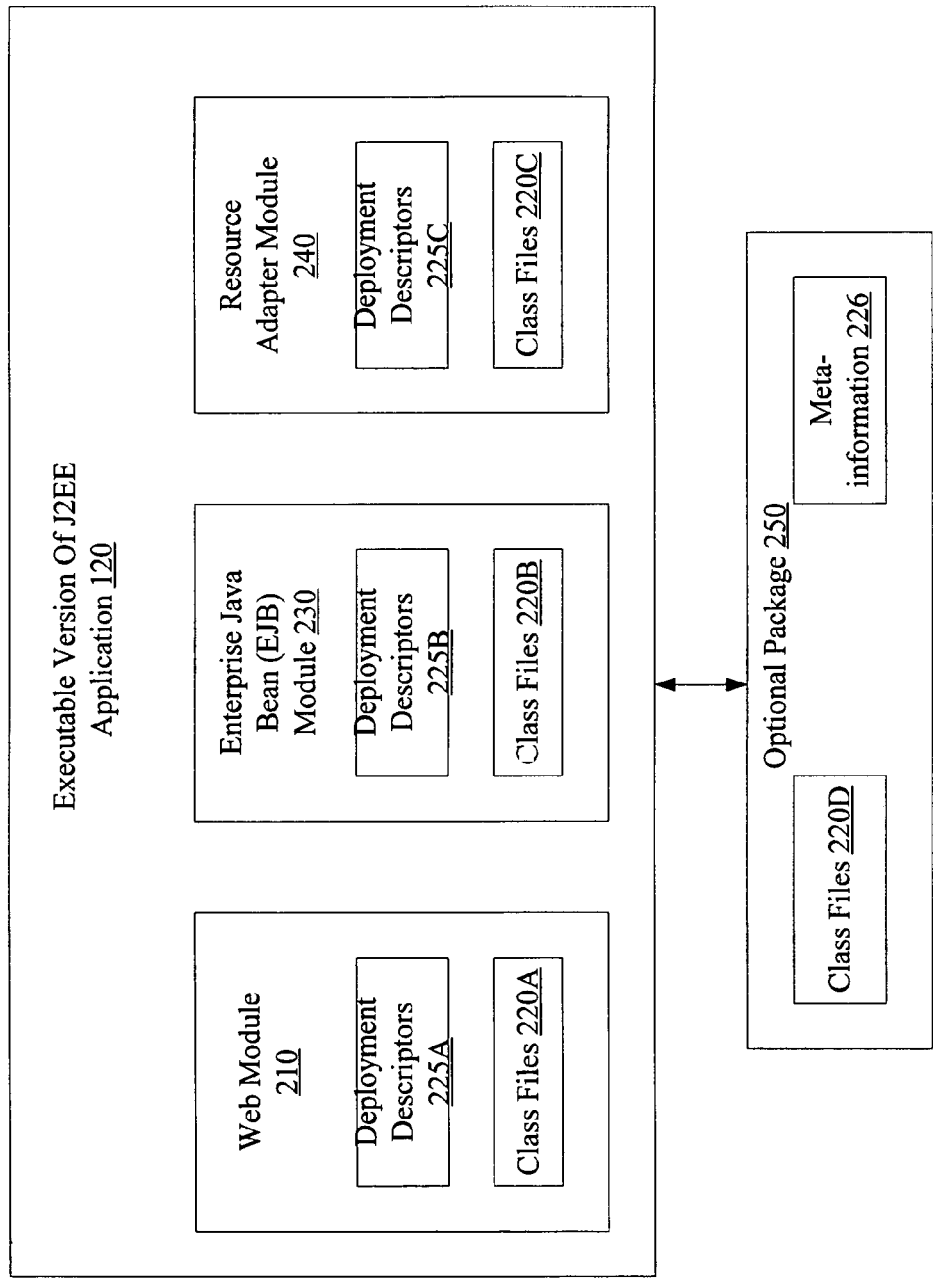
FIG. 2 is a block diagram illustrating various exemplary assembled modules of an executable version of an application intended for deployment to an application server that uses J2EE™ technology.

FIG. 2 is a block diagram illustrating various exemplary assembled modules of an executable version of application 120 intended for deployment to an application server 110 that uses J2EE™ technology. J2EE™ technology provides a component-based approach to the design, development, assembly and deployment of enterprise applications. Multi-tiered distributed applications built using reusable components may be supported in a J2EE™ environment. Logic for a multi-tiered application may be divided into components according to function, and the various application components may be installed within different hosts, depending on the tier to which the component belongs. For example, a multi-tier application may include a client tier, a web tier, a business tier and/or an enterprise information system (EIS) tier. Client-tier components may include web clients, applets, and/or other application client programs. Web tier components may include, for example, Java™ Servlets and JavaServer Pages (JSP™). Business tier components may include, for example, enterprise beans, which may include session beans, entity beans and/or message-driven beans. An EIS tier may include, for example, database servers, enterprise resource planning (ERP) systems, mainframe-based transaction processing systems, and other legacy applications.

An application server 110 may implement a number of different types of containers to provide access to various objects and support the application server services described above, as well as to provide a variety of other functions such as multithreading, state management, and the like. Before an application component is executed, it may have to be assembled into a module and deployed within an appropriate container. Various modules of the application 120 may in turn be aggregated into a deployable and executable format, such as an "ear" (enterprise archive) file in some embodiments. For example, in a J2EE™ environment, a web component may have to be assembled into a J2EE™ web module 210 and deployed into a web container at the application server for execution, and an enterprise bean may have to be assembled into a J2EE™ Enterprise Java Bean (EJB™) module 230 and deployed into an EJB container. In some embodiments, a J2EE™ application 120 may include one or more resource adapter modules 240 that may contain code that implements various functions for connecting with an Enterprise Information System (EIS) tier. In addition, in one embodiment, the deployable or executable version of the application 120 may also be bundled with one or more sharable optional packages 250, that may for example include a library of functions that may be accessed from the application modules, such as web module 210, enterprise bean module 230, etc.

As shown in FIG. 2, each assembled module may include a corresponding set of class files (e.g., files including executable code or "byte code" for the functions implemented by the module) and one or more deployment descriptors, which may specify metadata such as container settings associated with the module. For example, web module 210 may include class files 220A and deployment descriptors 225A, EJB module 230 may include class files 220B and deployment descriptors 225B, etc. The specific types of information included within deployment descriptors 225 may vary from one container to another. Optional package 250 may include meta-information 226. In some embodiments, the entire application 120 may itself include a single high-level deployment descriptor, in addition to the individual deployment descriptors associated with each component. Each module may be incorporated within a corresponding file, such as a "jar" or java archive file, and the contents of the file may be organized hierarchically (e.g., in a logical directory structure) according to a specification associated with the module type (e.g., a web module may be organized according to a first hierarchy, an EJB module according to a second hierarchy, etc.) In some embodiments, a module file such as a jar file or an application file such as an ear file may be expandable into a corresponding hierarchy of directories and files, including the corresponding class file hierarchy, e.g., by executing a command such as "jar-tvf <jarfileName>".

In one specific embodiment, a deployment descriptor 225B for an EJB module 230 may be included within an XML (Extensible Markup Language) file called "ejb-jar.xml". An ejb-jar.xml file may include a plurality of elements, including a root element bracketed by the XML tags <ejb-jar> and </ejb-jar> and various elements nested within the root element, such as a "enterprise-beans" element, a "relationships" element, and an "assembly-descriptor" element. The enterprise-beans element may contain descriptive information about various types of enterprise beans, such as session beans, entity beans and message-driven beans. Information relating various entity beans to each other, e.g., using container managed relationship functionality provided by the application server 110, may be included in the relationships element, and transaction and security information may be included in the assembly-descriptor element. For one or more enterprise beans included in the module, a corresponding element nested within the enterprise-beans element may identify various bean attributes, including a logical name for the bean, an object class of the bean, and one or more component interfaces for the bean. For example, information for a session bean may be included between <session> and </session> tags, information for an entity bean within <entity> and </entity> tags, and information for a message-driven bean within <message-driven> and <.message-driven> tags. The object class of the bean, which may be identified in a sub-element bracketed by <ejb-class> and </ejb-class> tags, is the class that implements the business methods and/or lifecycle management methods of the bean. The fully-qualified class name of the object class may be specified within the <ejb-class> and </ejb-class> tags (e.g., a string uniquely identifying the location of the class within a class hierarchy, such as the string "com.lmn.xyz.myclassA" for the class "myclassA"), allowing the location of the corresponding class file (e.g., within a directory "com/lmn/xyz" in the case of "com.lmn.xyz.myclassA") within the module to be determined. Similar information may be provided in deployment descriptors for other modules (e.g., in other XML files), such as web module 210, resource adapter module 240, and sharable optional package module 250, including identifications and locations of each of the top-level or "root" classes defined within the module. A variety of formats and techniques for implementing deployment descriptors may be used in different embodiments: e.g., for some versions of J2EE™ standards, annotations as well as XML may be used for deployment descriptors. As described below in further detail, portability verification tool 140 may be configured to examine the deployment descriptors associated with various components of an application to identify a set of root classes of the components, and to recursively analyze the class files corresponding to the root classes to identify violations of portability criteria 155. The root classes may comprise entry point classes in some embodiments, i.e., classes that are called by an application server when an application request arrives, in order to pass the execution context to the application.

Figure 3:
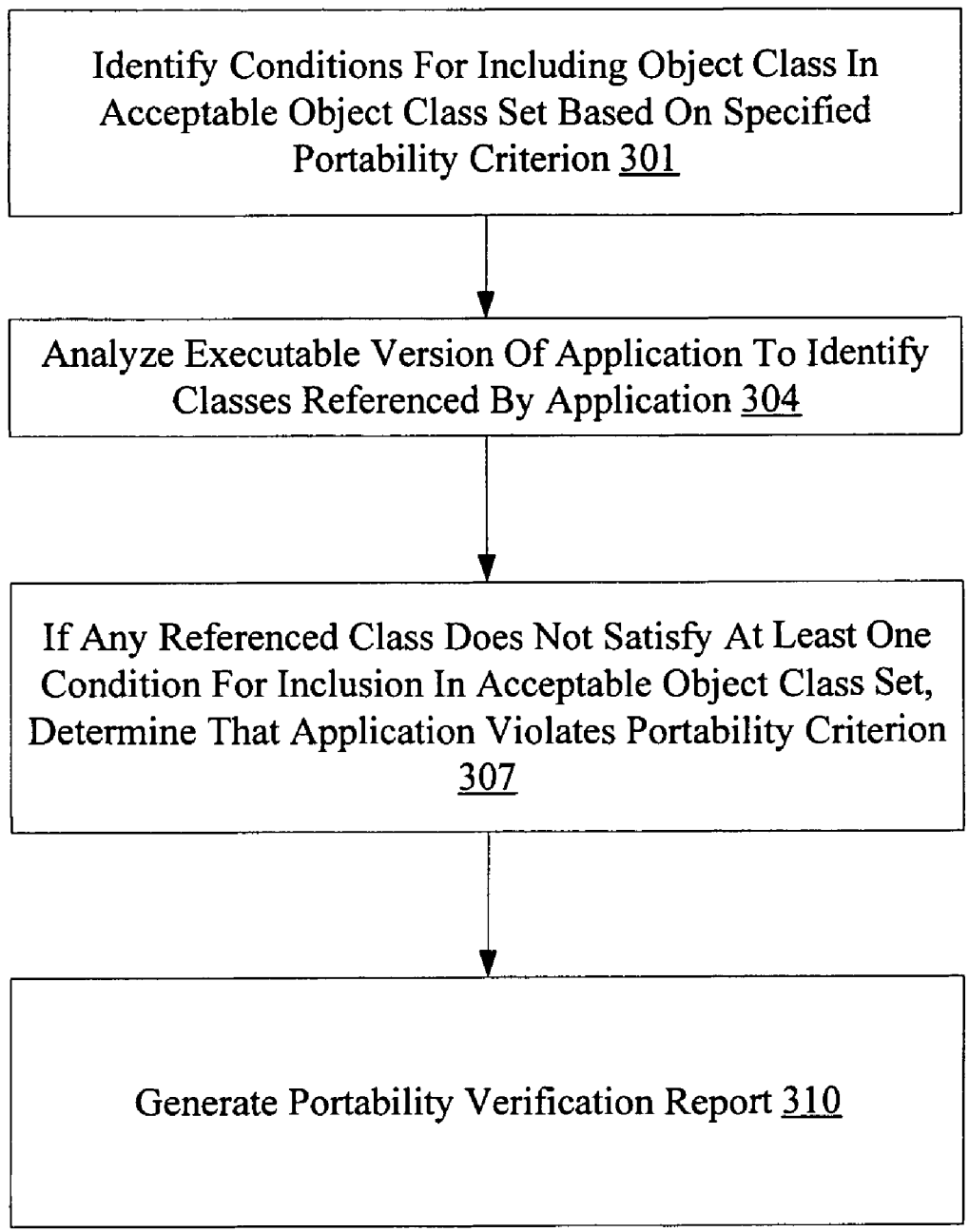
FIG. 3 is a flow diagram illustrating aspects of the operation of a portability verification tool, according to one embodiment.

FIG. 3 is a flow diagram illustrating aspects of the operation of portability verification tool 140, according to one embodiment. As shown in block 301 of FIG. 3, portability verification tool 140 may be configured to identify one or more conditions for including an object class in a set of acceptable object classes, where a reference to any acceptable class by application 120 complies with a specified portability criterion 155. In one embodiment, for example, the portability criteria may specify that the application should be compliant with a particular API standard or set of standards. Based on the portability criteria specified, the portability verification tool may be configured to identify the specific conditions that are to be tested to determine whether a particular object class referenced by the application is acceptable. In one embodiment, for example, the conditions to be tested may be identified as: (a) is the class defined within the application itself (e.g., within web modules 210, EJB modules 230, or resource adapter modules 240)? (b) is the class defined in a shared optional package 250 bundled with the application? and (c) is the class defined in one of the standard specifications identified in the portability criteria? In some embodiments, the portability verification tool 140 may be configured to generate a list of the specific APIs defined in the standard specifications, e.g., by examining and extracting interface names from various specification documents.

In one embodiment where the application 120 is deployed in a J2EE™ environment, the principle of operation of the portability verification tool 140 may expressed using set theory terminology as follows. If C is the set of classes referenced by the J2EE application 120 (i.e., a complete closure of the classes referenced directly or indirectly by the application), A is the set of classes defined directly within the J2EE application 120, O is the set of classes defined by the optional packages (both bundled and non-bundled optional packages) that the J2EE application depends on, and S is the set of classes J2EE™ standard classes that the application is allowed to access (depending on the version of J2EE™ standard or standards that the application is written against, e.g. the EJB 2.1 standard), the task of the portability verification tool is to accurately and efficiently identify the set N of non-standard APIs, where N is defined according to set theory as:

$$N = C \text{ minus}(A \text{ union } O \text{ union } S)$$

The set S may be determined, in such an embodiment, from the relevant J2EE™ specifications, and the sets C, A and O may be determined as described below in further detail.

Having identified the conditions for categorizing object classes as acceptable classes, portability verification tool 140 may be configured to analyze an executable version of the application 120 to identify the set of classes referenced in the application (block 304 of FIG. 3). As described below in further detail, in one embodiment portability verification tool 140 may be configured to recursively inspect object code for various object classes referenced by the application, starting with a set of root classes identified in deployment descriptors associated with the modules of the application. During the inspection of the object code for a given class, classes referenced by the given class may be identified, thus potentially allowing portability verification tool 140 to generate an exhaustive list of all the object classes referenced by the application. If a referenced class does not meet at least one of, the conditions for inclusion in the set of acceptable classes identified in operations corresponding to block 301, portability verification tool 140 may be configured to make a determination that the application 120 violates a portability criterion 155 (block 307). A portability report 150, which may indicate the results of the analysis (i.e., a determination whether the application is portable according to the specified criteria 155) and/or identify any classes found to be unacceptable or non-portable, may be generated at the end of the analysis. Portability report 150 may be organized in a variety of formats in various embodiments—for example, in one embodiment, in addition to conclusions regarding portability of the application 120, it may include a list of the classes found to be referenced from the application. In another embodiment, portability report 150 may include a representation of the calling hierarchy or call graph for the referenced classes (i.e., information identifying the specific classes that are referenced from each class in the application and/or the sequence in which they are referenced).

Figure 4A:
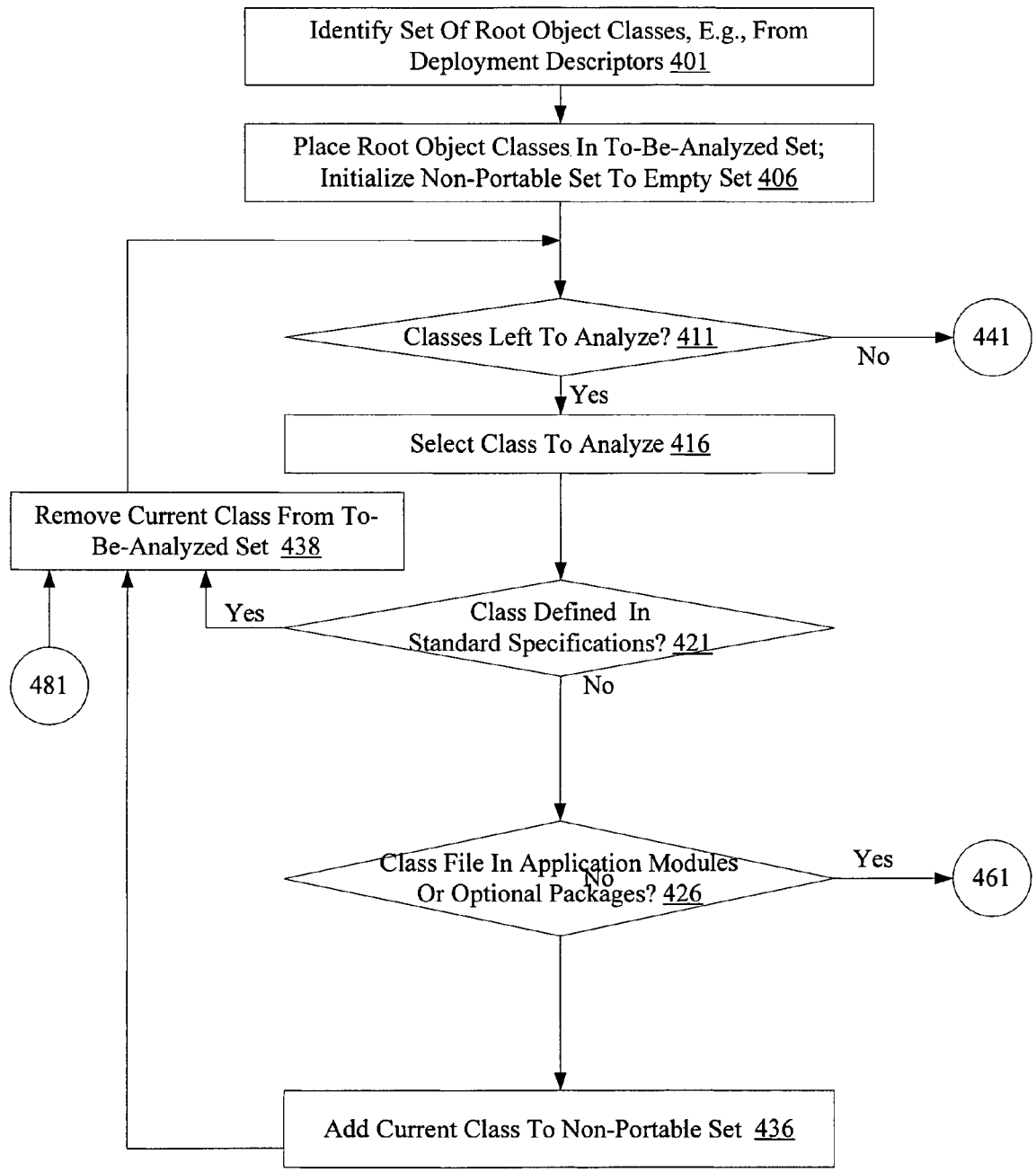
FIG. 4a and FIG. 4b are flow diagrams that collective illustrate further aspects of the operation of a portability verification tool, according to one embodiment.
Figure 4B:
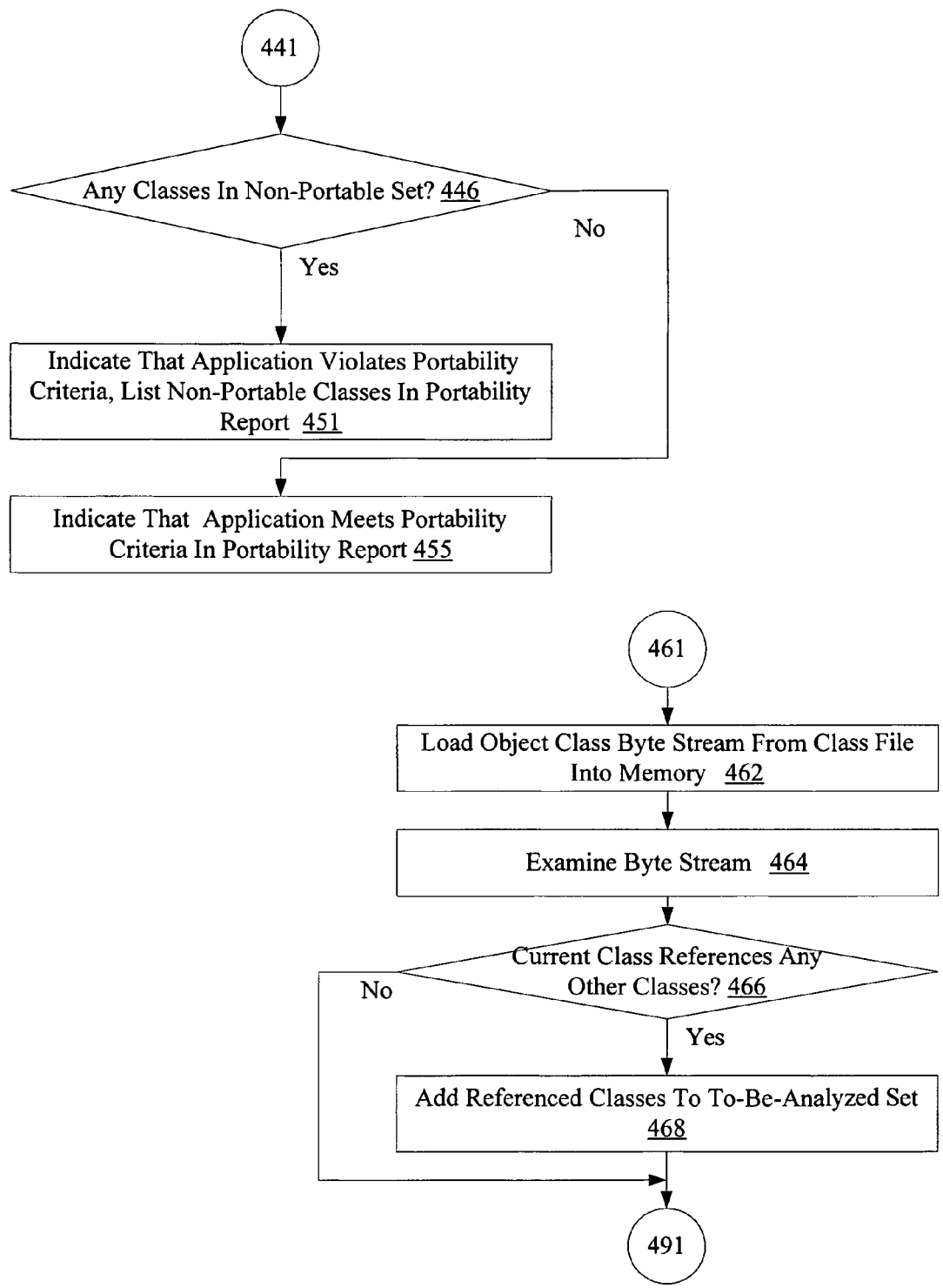

FIG. 4*a* and FIG. 4*b* are flow diagrams that collective illustrate further aspects of the operation of portability verification tool 140, according to one embodiment. In analyzing the executable version of application 120 (as depicted in block 304 of FIG. 3), portability verification tool 140 may be configured to first identify a set of root object classes of the application 120, e.g., by examining the contents of various deployment descriptors 225 (block 401 of FIG. 4*a*). Root object classes may comprise entry point classes in some embodiments, i.e., classes that are called by an application server when an application request arrives, in order to pass the execution context to the application. Root object classes may include, for example, externally accessible object classes referenced directly by clients of the application 120, e.g., via a remote interface for an entity bean. Portability verification tool 140 may be configured to place the root object classes in a set of classes to be analyzed (which may be termed the "To-Be-Analyzed" set herein), and to initialize a set of non-portable object classes as an empty set (block 406 of FIG. 4*a*). The To-Be-Analyzed set, during the course of the iterations described below, may include various elements of the set C (the set of classes referenced directly or indirectly by the application 120) described above in some embodiments.

Having identified the set of root classes, portability verification tool 140 may be configured to begin iterating over the classes in the To-Be-Analyzed set, analyzing each class in turn. The next class to be analyzed may be selected from the To-Be-Analyzed set (block 416). The manner in which the next class is selected from the To-Be-Analyzed set may differ in different embodiments; for example, in one embodiment, a class may be selected at random from the To-Be-Analyzed set, while in other embodiments, classes may be selected from the To-Be-Analyzed set in first-in-first-out (FIFO) sequence or last-in-first-out (LIFO) sequence. During the analysis of a given class, portability verification tool may be configured to determine whether the current class is defined in a standard API specification (block 421 of FIG. 41). The standard API specification may, for example, be included in a specification document identified in a portability criterion 155. In one implementation, the portability verification tool 140 may be configured to automatically generate a database or list of the APIs supported by the specification, e.g., in the form of an XML file representing the set S described above, by analyzing the text of a specification document. In other embodiments, a list of the APIs supported by the specification may be generated externally, and may be provided to the portability verification tool 140, e.g., as part of a parameter file used to specify a portability criterion. The use of an interface such as a parameter file to specify the list of APIs (or the corresponding standard specification document), may enable portability verification tool 140 to adapt gracefully as portability requirements or standards change, without for example, requiring source code changes in the tool itself. The portability verification tool may be configured to search the database corresponding to the API specification to determine whether the current class is defined in the specification. The database may be implemented using a variety of techniques in various embodiments, such as using a text file or files, one or more tables of a relational database system, an XML document object, etc. Various specific techniques may be used to perform the search in the API database: e.g., depending on the manner in which the database is implemented, a text search (e.g., using a tool similar to the "grep" tool provided in various UNIX based operating systems), a relational database query, or a set containment query expressed in a language such as Java™ (e.g., using a java.util.Set.contains( ) method), may be used.

If the class is found in the standard API specification, it may be removed from the To-Be-Analyzed set (block 438) and the next class may be examined. If the class is not found in the standard API specification, portability verification tool 140 may be configured to analyze the object code of the class to identify additional classes referenced from that class, and recursively analyze each referenced class in turn. As shown in FIG. 4*a*, portability verification tool 140 may be configured to begin a search for a class file (i.e., a file containing executable code or byte code) corresponding to the current class being analyzed (block 416). In the search for the class file, portability verification tool 140 may attempt to locate the class file among the modules of the application 120 (e.g., web module 210, EJB module 230, and Resource Adapter Module 240) or in optional package 250 (block 426). If the class file is found within the modules of the application or in an optional package, a byte stream representing the object code for the class may be loaded from the class file into memory (block 462 of FIG. 4*b*, reached by following the path through the connecting node labeled 461). The byte stream may then be examined to identify any classes referenced by the current class (block 464 of FIG. 4*b*), as described below in further detail in conjunction with the description of FIG. 5. If one or more referenced classes are found (as determined in decision block 466 of FIG. 4*b*), the referenced classes may be placed in the To-Be-Analyzed set (block 468 of FIG. 4*b*). Whether referenced classes are found or not, the current class may be removed from the To-Be-Analyzed set (block 438 of FIG. 4*a*, reached via connecting node 481), and any remaining classes in the To-Be-Analyzed set may be analyzed, starting with the operations corresponding to block 411 of FIG. 4*a*.

In one embodiment, portability verification tool may include a class file loader configured to perform the search for the class file described above. A class file loader may be provided a class name and a search path (e.g., a set of file and/or directory locations) as inputs, and the search path may be set to point to the modules of the application and/or the optional packages, so that, for example, classes belonging to the sets A and O described above may be identified using the search path. For example, an exemplary search path for such a class loader may be specified as a colon-separated list of jar files and directories such as: /as1/app1/x.jar:/as1/app1/y.jar:/as1/home/opt. In this example, when searching for a named class, the class file loader may first examine the file x.jar located in the directory /as1/app1. If the class is not found in x.jar, y.jar in the same directory may be searched. The jar files x.jar and y.jar may each contain application module elements or components. If the class is not found in y.jar, the directory /as1/home/opt, which may contain optional packages 250, may be searched. Files and/or directories within the opt directory may be searched recursively as well, until either a class file corresponding to the named class is found, or no more files or directories remain to be searched. In one embodiment, a fully-qualified name for the current class may be provided as input to the class file loader. The class file loader may be implemented using any desired programming and/or scripting language or languages in various embodiments. In one implementation, for example, where the Java™ programming language is used, the class file loader may be implemented using the java.net.URLClassLoader class to load the class files. The search path may be formatted as one or more URLs (Universal Resource Locator) and passed as a parameter to a constructor for the URLClassLoader class in such an implementation, and a method such as getResourceAsStream (String resourceName) may be used to find the class file.

In one embodiment where, for example, the application is deployed in a J2EE™ environment, the class loader may be configured to use a search path (which may also be termed a class path) that follows class loading rules that are specified within a standard specification, such as a J2EE™ platform specification. The application may be packaged using the Java Archive (JAR) format into a file with a ".ear" (enterprise archive) extension. The .ear file may include an application-level deployment descriptor, the application's own J2EE™ modules (e.g., modules 210, 230, and 240, which may themselves be packaged as jar files, war files or rar files according to the JAR format), libraries such as optional packages 250, help files, documentation, etc. The class loading rules may include, for example, specific techniques to be used to indicate a path to the classes of an optional package 250 from an application module or jar file. A JAR file may reference the classes of another jar file by naming the referenced file in a class path entry in the referencing file's "manifest" file according to one such rule. The referenced jar file may be named using a URL relative to the referencing file's URL. The manifest file may be placed in a specific directory within the referencing file, such as "META-INF/MANIFEST.MF", and the class path entry within the manifest file may be specified as a list of jar files separated by spaces. The class path format (and the rules for locating the class paths) included in the specification may also be used by the class file loader during portability verification in some embodiments.

If the current class is not defined in the standard API specification, and is not found in the application modules or the optional packages, the class may be placed in the set of non-portable classes (e.g., in set N as described above) (block 436 of FIG. 4a) and removed from the To-Be-Analyzed set (block 438 of FIG. 4a). The operations corresponding to blocks 411 onwards may then be repeated: i.e., if any classes remain to be analyzed, a particular class may be selected as the next class to be analyzed, and operations corresponding to blocks 421 onwards may be repeated for that class. If no classes remain to be analyzed, as detected in decision block 411, portability verification tool 140 may be configured to generate portability report 150. If any classes are found in the non-portable set (as determined in block 446 of FIG. 4b, reached by following a path through connecting node 441 from FIG. 4a), portability verification tool 140 may be configured to indicate that the application 120 does not meet portability criteria 155, and may include a list of the non-portable classes in the report (block 451 of FIG. 4b). If no non-portable classes were found during the analysis, portability verification tool 140 may be configured to indicate that the application 120 did not violate the portability criteria (block 455 of FIG. 4b).

It is noted that, by using the technique of recursively examining referenced classes as depicted in the embodiment of FIG. 4a-4b, a transitive closure of all the classes that are referenced in the application 120 (e.g., set C as defined above), starting from the root classes, may eventually be examined. Furthermore, unlike some conventional portability verification techniques, the technique described above does not require a list or repository of non-standard or vendor-specific APIs to be generated or maintained. It is also noted that some of the operations illustrated in FIG. 4a and FIG. 4b may be performed in a different order in some embodiments—for example, the check as to whether the class is defined in the standard specification (block 421) may be performed after the search for the class files in the application modules and optional packages (block 426). In one embodiment, the operations of searching for the class among the application modules may be performed in a separate step than the operations of searching for the class among the optional packages.

In some embodiments, optimizations may be made to some of the operations illustrated in FIG. 4a-4b. For example, in one implementation, portability verification tool 140 may be configured to maintain a history or record of classes that have already been analyzed, and may be able to avoid repeated analysis of the same class file. If a chain of references such as class_A→class_B→class_C→class_D is followed during the analysis in such an implementation (i.e., if class_A references class_B, class_B references class_C, class_C references class_D, and class_D references no further classes, and the byte code each of the classes is examined for referenced classes as illustrated in FIG. 4a-FIG. 4b), portability verification tool 140 may store a record of its analysis of the chain of references. If, later in the analysis process, class_B is encountered again (e.g., via another chain of references), the portability verification tool may be configured to check whether class_B has been analyzed before, and may be able to avoid re-loading and re-analyzing classes class_B, class_C and class_D. In another optimization, the analysis of different chains of class references may be performed in parallel in some implementations. For example, in one such implementation, portability verification tool 140 may be multithreaded, and each of two or more of its threads may be assigned to analyze a particular root class and the classes referenced directly or indirectly by the particular root class. In some configurations, the number of threads that may be used for such parallel analysis may be governed by a configurable parameter, e.g., an input parameter provided to portability verification tool 140.

As noted above, in some embodiments portability verification tool 140 may be configured to analyze a byte stream of executable code of a given class to identify any other classes referenced from the given class, e.g., after reading the contents of the corresponding class file into memory using a class loader. The format in which executable code for a class is stored may, in general, vary from one execution environment to another, and may be based on a formal object file format specification, e.g., issued by a standards body. In some embodiments, portability verification tool 140 may be designed to support analysis of executable code in a variety of formats. In one such embodiment, portability verification tool 140 may be configured to receive information, e.g., via an input parameter, identifying or describing the specific format in which the executable code for a given application 120 is organized.

In one specific embodiment, where the Java™ programming language is used to implement the application 120, the object code within a class file of the application may be formatted according to a standard defined in the Java™ Virtual Machine Specification. FIG. 5 is a block diagram illustrating an exemplary class file structure 500 organized in accordance with such a standard, according to one embodiment. As shown, the class file structure may include a plurality of elements, such as Magic_Number 501, Minor_Version 503, etc., arranged in a specific sequence defined in the corresponding specification. Some elements may be of fixed length, as indicated in column 590 labeled Field Length (Bytes), while the length of other elements (such as Constant_Pool 509 and Interfaces 519) may vary from one class file to another based on the values of other elements in the class file. The size of the Constant_Pool table 555 for a given class file, for example, may be a function of the value of the Constant_

Pool_Count element 507 in that class file. Since the lengths of various elements of a class file structure 500 are either invariant across all class files, or determinable from values stored within the class file, it may be possible to navigate to any element of interest within any given class file. For example, as described below, portability verification tool 140 may be configured to navigate to the Constant_Pool table 555 to identify strings representing one or more classes referenced from the class corresponding to the class file.

The various elements of class file structure 500 may represent the following information. Magic_Number 501 may be used as an identifier for the class file format itself. Minor_Version 503 and Major_Version 505 may identify the specific version of the class file format identified by Magic_Number. Constant_Pool_Count 507 may indicate the number of entries in Constant_Pool 509, which may be organized as a table 555 of string constants, class and interface names, field names, and other constants that are referred to within the class file. Class names may be stored in fully qualified form within Constant_Pool 509. Access_Flags 511 may be a mask of flags used to denote access permissions to the class file. This_Class 513 and Super_Class 515 may be pointers into the Constant_Pool table 555, identifying the names of the current class (i.e., the class whose executable code is in the class file) and its parent class respectively. Interfaces_Count 517 may indicate the number of direct superinterfaces of the current class, and Interfaces 519 may include pointers into Constant_Pool table 555 where the names of the superinterfaces are stores. Fields_Count 521 may indicate the number of fields declared in the current class and described in the Fields element 523. Similarly, Methods_Count 525 may indicate the number of methods declared in the current class and described in Methods structure 527, and Attributes_Count 529 may indicate the number of attributes of the current class stored in Attributes structure 531.

In embodiments where the format illustrated in FIG. 5 is employed for storing the executable version of an object class, portability verification tool 140 may be configured to identify referenced classes from the names stored in the Constant_Pool table 555. In some implementations, portability verification tool 140 may utilize an existing set of utilities or functions, such as the Byte Code Engineering Library (BCEL) available from Apache Software, to extract names of referenced classes from the Constant_Pool table 550. For example, BCEL provides a package called "org.apache.bcel.classfile" to access and manipulate class file structure 500, and includes interfaces such as "org.apache.bcel.classfile.Visitor" to provide access to various elements of the class file structure.

Figure 6:
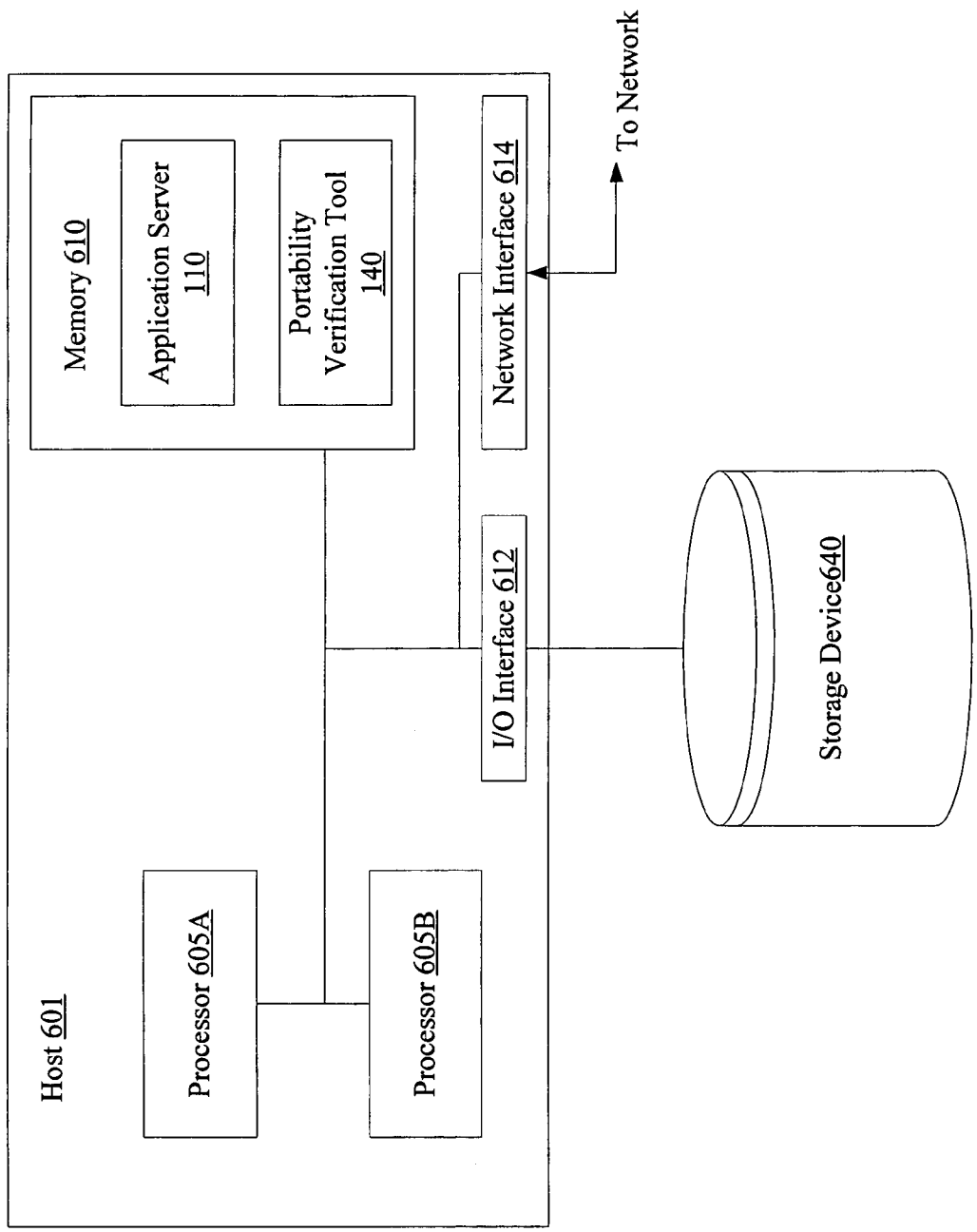
FIG. 6 is a block diagram of a computer host according to one embodiment.

FIG. 6 is a block diagram of a computer host 601 according to one embodiment. As shown, host 601 may include one or more processors 605, such as processors 605A and 605B. In various embodiments, processors 605 may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of portability verification tool 140 may be partly or fully resident within a memory 610 at a given point in time, and may also be stored on a storage device 640. In various embodiments, portability verification tool 140 may be packaged as a standalone application, or may be packaged along with an application server 110 or included within a suite of software tools. Memory 610 may be implemented using any appropriate medium such as any of various types of RAM (e.g., DRAM, SDRAM, RDRAM, SRAM, etc.). In addition to processors 605 and memory 610, host 601 may also include one or more I/O interfaces 612 providing access to storage devices 640, one or more network interfaces 614 providing access to a network, and the like. Any of a variety of storage devices may be used to store the instructions as well as data for portability verification tool 140 in different embodiments, include any desired type of persistent and/or volatile storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
determining a set of non-portable object classes of an application, the determining comprising:
identifying a set of root object classes defined by the application;
validating the root object classes, the validating comprising:
adding to the set of non-portable object classes each of the root object classes that is not defined by the application, not defined by a shared optional package, and not one of a set of standard object classes;
analyzing an executable version of the application to identify object classes referenced directly or indirectly by the root object classes, wherein said analyzing comprises parsing at least some of the executable version of the application and does not comprise executing the application;
repeating the validating for each of the object classes referenced by the root object classes;
generating a portability verification report for the application, wherein the portability verification report indicates that the application violates a portability criterion if the set of non-portable object classes is not empty.

2. The method as recited in claim 1, wherein a standard object class is one defined in a particular version of a standard application programming interface (API) specification identified in the specified portability criterion.

3. The method as recited in claim 1, further comprising: examining one or more specification documents to automatically identify a set of interfaces belonging to the set of standard object classes.

4. The method as recited in claim 1, wherein one or more of the root object classes correspond to entry point classes.

5. The method as recited in claim 1, wherein the shared optional package is bundled with the application.

6. The method as recited in claim 1, wherein parsing the executable code includes:
loading a byte stream representing the executable code of the root object class into a region of memory, wherein the byte stream is formatted in accordance with a particular object class file format specification;
identifying a section of the byte stream that includes names of one or more object classes referenced by the root object class; and
obtaining names of the one or more non-root object classes referenced by the root object class from the section of the byte stream.

7. The method as recited in claim 6, further comprising:
determining a location of a file containing the byte stream within the executable version of the application using a name of the root object class and a specified search path.

8. The method as recited in claim 1, wherein the executable version of the application includes a deployment descriptor, wherein identifying the root object classes includes reading names of the root object classes from the deployment descriptor.

9. The method as recited in claim 1, further comprising:
providing an interface to specify the portability criterion;
in response to input via the interface, identifying a new portability criterion without modifying source code; and
as part of the validating, adding to the set of non-portable object classes, each of the object classes that does not meet the new portability criterion.

10. A system, comprising:
a processor; and
a memory coupled to the processor, wherein the memory stores program instructions computer-executable by the processor to:
determine a set of non-portable object classes of an application, the determining comprising:
identify a set of root object classes defined by the application;
validate the root object classes, the validating comprising:
add to the set of non-portable object classes each of the root object classes that is not defined by the application, not defined by a shared optional package, and not one of a set of standard object classes;
analyze an executable version of the application to identify object classes referenced directly or indirectly by the root object classes, wherein said analyzing comprises parsing at least some of the executable version of the application and does not comprise executing the application;
repeat the validating for each of the object classes referenced by the root object classes;
generate a portability verification report for the application, wherein the portability verification report indicates that the application violates a portability criterion if the set of non-portable object classes is not empty.

11. The system as recited in claim 10, wherein a standard object class is one defined in a particular version of a standard application programming interface (API) specification identified in the specified portability criterion.

12. The system as recited in claim 10, wherein the instructions are further computer-executable to:
examine one or more specification documents to automatically identify a set of interfaces belonging to the set of standard object classes.

13. The system as recited in claim 10, wherein to parse the executable code, the instructions are further computer-executable to:
load a byte stream representing the executable code of the root object class into a region of memory, wherein the byte stream is formatted in accordance with a particular object class file format specification;
identify a section of the byte stream that includes names of one or more object classes referenced by the root object class; and
obtain names of the one or more non-root object classes referenced by the root object class from the section of the byte stream.

14. The system as recited in claim 13, wherein the instructions are further computer-executable to:
determine a location of a file containing the byte stream within the executable version of the application using a name of the root object class and a specified search path.

15. The system as recited in claim 10, wherein the executable version of the application includes a deployment descriptor, wherein to identify the root object classes, the instructions are further computer-executable to: read names of the root object classes from the deployment descriptor.

16. A computer readable storage device comprising program instructions, wherein the instructions are computer-executable to:
determine a set of non-portable object classes of an application, the determining comprising:
identify a set of root object classes defined by the application;
validate the root object classes, the validating comprising:
add to the set of non-portable object classes each of the root object classes that is not defined by the application, not defined by a shared optional package, and not one of a set of standard object classes;
analyze an executable version of the application to identify object classes referenced directly or indirectly by the root object classes, wherein said analyzing comprises parsing at least some of the executable version of the application and does not comprise executing the application;
repeat the validating for each of the object classes referenced by the root object classes;
generate a portability verification report for the application, wherein the portability verification report indicates that the application violates a portability criterion if the set of non-portable object classes is not empty.

17. The computer readable storage device as recited in claim 16, wherein a standard object class is one defined in a particular version of a standard application programming interface (API) specification identified in the specified portability criterion.

18. The computer readable storage device as recited in claim 16, wherein the instructions are further computer-executable to:
examine one or more specification documents to automatically identify a set of interfaces belonging to the set of standard object classes.

19. The computer readable storage device as recited in claim 16, wherein, to parse the executable code, the instructions are further computer-executable to:
load a byte stream representing the executable code of the root object class into a region of memory, wherein the byte stream is formatted in accordance with a particular object class file format specification;
identify a section of the byte stream that includes names of one or more object classes referenced by the root object class; and
obtain names of the one or more non-root object classes referenced by the root object class from the section of the byte stream.

20. The computer readable storage device as recited in claim 19, wherein the instructions are further computer-executable to:
determine a location of a file containing the byte stream within the executable version of the application using a name of the root object class and a specified search path.

21. The computer readable storage device as recited in claim 16, wherein the executable version of the application includes a deployment descriptor, wherein to identify the root object classes, the instructions are further computer-executable to: read names of the root object classes from the deployment descriptor.

* * * * *